United States Patent [19]

Yoshida et al.

[11] Patent Number: 4,950,562
[45] Date of Patent: Aug. 21, 1990

[54] SOLID ELECTROLYTE TYPE FUEL CELLS

[75] Inventors: Toshihiko Yoshida; Tsukasa Shima; Fumiya Ishizaki; Hiroyuki Iwasaki; Isao Mukaizawa; Yoshiyuki Someya; Satoshi Sakurada, all of Saitama; Osamu Yamamoto, Gifu, all of Japan

[73] Assignee: Toa Nenryo Kogyo Kabushiki Kaisha, Tokyo, Japan

[21] Appl. No.: 340,306

[22] Filed: Apr. 19, 1989

[30] Foreign Application Priority Data

Apr. 21, 1988 [JP] Japan .................................. 63-96757
May 23, 1988 [JP] Japan .................................. 63-123958
Nov. 28, 1988 [JP] Japan .................................. 63-300079
Dec. 28, 1988 [JP] Japan .................................. 63-329105

[51] Int. Cl.$^5$ .............................................. H01M 8/10
[52] U.S. Cl. ........................................ 429/32; 429/33; 429/34
[58] Field of Search .................. 427/30, 32, 33, 38, 427/39, 34

[56] References Cited

U.S. PATENT DOCUMENTS

| | | | |
|---|---|---|---|
| 3,554,808 | 1/1971 | Fischer et al. | 429/32 |
| 4,476,198 | 10/1984 | Ackerman | 429/33 X |
| 4,599,282 | 7/1986 | Hirota et al. | 429/34 X |
| 4,704,340 | 11/1987 | Kunz | 429/34 X |
| 4,749,632 | 6/1988 | Flandermeyer et al. | 429/33 X |
| 4,824,741 | 4/1989 | Kunz | 429/33 X |
| 4,826,741 | 5/1989 | Aldhart et al. | 429/30 |

Primary Examiner—Anthony Skapars
Attorney, Agent, or Firm—Armstrong, Nikaido, Marmelstein, Kubovcik & Murray

[57] ABSTRACT

The present invention provides a solid electrolyte type of fuel cell of a planar type structure comprising a plurality of solid electrolyte plates, each being in the form of a flat plate and having a porous cathodic layer on one side and a porous anodic layer on the other side, which are laminated together through an interconnector plate provided in both its sides with grooves defining gas passages, wherein oxidizing agent and fuel gases are fed through said passages to the cathodic and anodic sides, thereby reducing the length of a current path running through regions of high resistance, increasing the degree of integration and improving reliability. By using heat-resistant parts for the interconnectors, cathodes and anodes, it is also possible to improve the resistance to oxidation and reduction as well as durability and obtain low resistance. it is further possible to obtain a fuel cell having satisfactory properties and capable of standing up to use over an extended period of time by using solid electrolyte for fuel cells which is obtained by sintering $Y_2O_3$-containing partially stabilized zirconia added with 5 to 20 % of alumina, has low resistance and high mechanical strength and is stable.

10 Claims, 12 Drawing Sheets

○● LaCoO$_2$ sputtered on alloy
□ Alloy

|       | 1250°C | 1350°C | 1450°C | 1550°C | 1650°C |
|-------|--------|--------|--------|--------|--------|
| 3 Y   | 100    | 100    | 99     | 94     | 84     |
| 3 Y 5A | 100   | 100    | 100    | 100    | 99     |
| 3 Y 20A | 100  | 100    | 100    | 100    | 99     |
| 3 Y 40A | 100  | 100    | 100    | 100    | 100    |

SOLID ELECTROLYTE TYPE FUEL CELLS

BACKGROUND OF THE INVENTION

The present invention relates to a solid electrolyte type fuel cell and, more particularly, to a solid electrolyte fuel cell which is of a planar type structure and is obtained by using a low-resistant solid electrolyte stable over an extended period of time, a heat-resistant part obtained by covering the surface of a heat-resistant alloy with an electrically conductive film resistant to oxidation and reduction, and the like.

Referring to FIG. 13, there is shown the basic structure of a solid electrolyte fuel cell in which a cathode (e.g., perovskite-type $La_{0.9}Sr_{0.1}MnO_3$) 32 and an anode (e.g., $NiO/ZrO_2$) 33 are provided on both sides of a solid electrolyte 31 (e.g., partially stabilized zirconia) in the form of films, and oxygen (air) is supplied to the cathode 32 as an oxidizing agent, while hydrogen, carbon monoxide, naphtha gas, naphtha-modified gas, liquefied natural gas (LNG), LPG or the like is fed to the anode 33 as a fuel gas. Zirconia ($ZrO_2$) shows an electrical conductivity of 0.5 $\Omega^{-1}cm^{-1}$ at 1,000° C. due to ion conduction, i.e., the transfer of $O^{2-}$, and is stabilized by calcium or yttrium because it is very fragile. The cell reactions occurring in such an example are expressed in terms of:

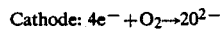

Cathode: $4e^- + O_2 \rightarrow 2O^{2-}$

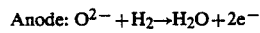

Anode: $O^{2-} + H_2 \rightarrow H_2O + 2e^-$ with $O^{2-}$ being transferred through zirconia.

The foregoing refers to the structure of a unit cell. In order to connect a plurality of integrated unit cells in parallel (or in series), connections are made between the electrodes of the adjacent unit cells by means of interconnectors. The structure of an actual fuel cell is then determined depending upon how to integrate together the unit cells. Until now, some integrated structures have been proposed and are now under development so as to put them to practical use.

With respect to the structure of this type of fuel cell, Westinghouse Electric Corp. and Electronics Techniques Laboratories have proposed such a cylindrical structure as illustrated in FIG. 14.

Referring to FIG. 14, a fuel gas is fed into a tubular member 41 and an oxidizing gas is passed thereover. As will be appreciated from an enlarged view of a wall region included in the same figure, an integrated cell structure comprising a porous anode 43, an interconnector 44, an electrolyte 45, a composite oxide cathode 46 and an airtight film 47 of alumina is formed on a porous alumina wall 42 defining a support tube.

Besides, another cylindrical structure and interconnection structure have been proposed by Westinghouse Electric Corp. and such a monolithic type structure as shown in FIG. 15 by Argonne National Institutions. In FIG. 15, reference numeral 51 stands for a solid electrolyte, 52 an anode, 53 a cathode, 54 an interconnector, 55 a fuel passage and 56 an air passage.

In the cylindrical structure shown in FIG. 14, however, the current flows through the cathode-solid electrolyte-anode in the radial direction of the cylindrical body but, in an integrated assembly, the current generated in the unit cell flows through the cathode-interconnector-anode in the lengthwise direction of the cylindrical body. Consequently, the current is required to flow through a long current path running through the cathode and anode of high sheet resistance, during which increased ohmic losses occur. This is because there may be no choice but to use a material of increased area resistance as an electrode material due to a serious electrode corrosion problem caused by the operation of the solid electrolyte type of fuel cell at high temperatures. With the solid electrolyte type of fuel cell of another cylindrical structure proposed by Westinghouse Electrical Corp., such an ohmic loss problem caused by a long current path running through the anode and cathode of increased area resistance cannot still be solved.

Turning to the monolithic type of fuel cell according to Argonne National Institutions, shown in FIG. 15, it achieves as high degrees of integration and short current paths as cannot be obtained with the cylindrical type. However, it poses a reliability problem due to its complicated structure and the need for sophisticated constructional techniques, and is thus far from practical use.

In recent years, on the other hand, cells of new structures have been proposed with a view to developing fuel cells of higher performance.

Referring to FIG. 16, there is shown a honeycomb structure 61 formed of a solid electrolyte such as the partially stabilized zirconia, wherein fuel 62 and air (oxygen) 63 are alternately fed to cells in countercurrent relationship, and an anode is formed on the wall surface of the cell to which the fuel 62 is fed, while a cathode is formed on the wall surface of the cell to which the air (oxygen) 63 is supplied.

Referring to FIG. 17, fuel 74 and air (oxygen) 75 are fed to every other space of stratified spaces 72 and 73 defined by a plurality of solid electrolyte partitions 71 in the perpendicular directions, and an anode 76 is formed on the fuel (74) side of each partition 71 while a cathode 77 is formed on the air (oxygen) side.

The cells of the types shown in in FIGS. 16 and 17 are expected to give an extremely high energy density per unit volume and be suitable for mass-production since conventional ceramic techniques are applicable thereto.

Incidentally, stabilized zirconia used as the solid electrolyte for fuel cells show much superior electrical properties as expressed in terms of low resistance, but is mechanically so fragile. For that reason, particular attention is now paid to partially stabilized zirconia which has higher resistance value but possesses higher mechanical strength, as compared with the stabilized zirconia.

Referring then to the partially stabilized zirconia, it is present in the form of a mixture of a tetragonal phase (hereinafter referred to as the T-phase) with a monoclinic phase (hereinafter called the M-phase), and has the property of lowering its electrical conductivity in the presence of the M-phase. As the M-phase-free zirconia consisting of the T-phase alone is held at high temperatures over an extended period of time, the T to M-phase transformation occurs, resulting in an increase in the proportion of the M-phase. Because the density of the M-phase is lower than that of the T-phase, when the T to M-phase transformation occurs, the volume of grains is so increased that intergranular fracture proceeds further, resulting in further increased resistance value and decreased mechanical strength.

Thus, the problems with the partially stabilized zirconia are that when it is used as a solid electrolyte, the proportion of the M-phase is increased by sintering at a temperature as high as 1,400° to 1,500° C. or upon used as a part of fuel cells at high temperatures over an extended period of time, leading to a lowering of electrical conductivity, while intergranular fracture proceeds, resulting in increased resistance value and decreased mechanical strength.

Preferably, the interconnector for the solid electrolyte type of fuel cell should meet the following requisites.

(1) It should be stable in an oxidizing and reducing atmosphere at high temperatures.

(2) It should be an electrically good conductor in an oxidizing and reducing atmosphere at high temperatures.

(3) It should possess a coefficient of thermal expansion close to that of an oxide ion conductive solid such as stabilized zirconia.

(4) It should have a coefficient of thermal expansion close to that of an electrode material.

The cathode collector should also satisfy the following requisites.

(1) It should be stable in an oxidizing atmosphere at high temperatures.

(2) It should be an elctrically good conductor in an oxidizing atmosphere at high temperatures.

(3) It should possess a coefficient of thermal expansion close to that of an oxide ion conductive solid such as stabilized zirconia.

(4) It should have a coefficient of thermal expansion close to that of an electrode material.

Heretofore, metals or electrically conductive ceramics have been used for interconnectors and collectors. However, when metallic interconnectors and collectors are used at temperatures of 600° C. or higher, there are formed on their surfaces oxides, which then give rise to considerably increased contact resistance and hence increased power losses due to resistance, thus resulting in deteriorations of fuel cell characteristics. As the electrically conductive ceramics to meet the above requisites, proposed are composite metal oxides, e.g., perovskite-type oxides expressed by $La_{1-x}M^1_xM^2O_3$ (wherein $M^1$ is Sr, Ca or Ba and $M^2$ is Co, Fe, Mn, Ni or Cr), esp., $La_{1-x}Sr_xCrO_3$. However, although such ceramics are electrically conductive, they possess nonnegligible resistance. In the cylindrical thin-film type of fuel cell proposed by Westinghouse Electrical Corp., wherein the perovskiter-type oxide is used as the cathodic material, the cathodic resistance accounts for about 65% of the total cell resistance, and forms a barrier against improvements in the energy efficiency of fuel cells. The most serious problems with the fuel cells of the types shown in FIGS. 16 and 17 are posed by the collector in the structure of FIG. 16 and the inerconnectors in the structure of FIG. 17, respectively.

SUMMARY OF THE INVENTION

An object of the present invention is to provide a structure of a solid electrolyte type of fuel cell, which has a short current path running through high-resistance regions, possesses an increased degree of integration and is of high reliability.

Another object of the present invention is to provide a structure of a solid electrolyte type of fuel cell, which uses a heat-resistant, electrically conductive part suitable for collectors or interconnectors.

A further object of the present invention is to provide a fuel cell using a solid electrolyte in which the occurrence of the M-phase is reduced to an extremely low level, even when sintered at high temperatures and used as a part of the fuel cell at high temperatures over an extended period of time, thereby preventing a lowering of its electrical conductivity and increasing its mechanical strength.

According to the present invention, the above objects are achieved by the provision of a solid electrolyte type of fuel cell of a structure comprising a plurality of solid electrolyte plates, each being in the form of a flat plate and having a porous cathodic layer on one side and a porous anodic layer on the other side, which are laminated together through an electrically conductive interconnector plate provided in both its sides with grooves defining gas passages, wherein oxidizing agent and fuel gases are fed to the cathodic and anodic sides through said passages, and a current is obtained from anodic and cathodic electrodes located at upper and lower ends of an assembly of the laminated cells.

Fuel cells of such a planar type structure are known for carbonate type of fuel cells, etc., but are not still known for solid electrolyte type of fuel cells presumably for the following reasons. Heretofore, chromite base composite oxides (such as $La_{1-x}Mg_xCrO_3$ or $La_{1-x}Al_xCrO_3$) and the like have been used for interconnectors. With such oxides, however, it has been impossible to obtain such a structure as claimed in the present invention because of difficulty involved in their intimate sintering and their noticeable fragility. When metals are used for interconnectors, the contact resistance between the inerconnectors and the electrodes is so increased that the cell characteristcs deteriorate considerably, because the metal is oxidized at 1,000° C. on the oxidizing agent side.

In the course of intensive studies made by the present inventors so as to attain the aforesaid objects, it has been found that the solid electrolyte type of fuel cell of a planar type structure is realizable by taking means such as the development of a material for heat- and corrosion-resistant interconnectors, and such a planar type structure can provide a solid electrolyte type fuel cell which has a short current path running through high-resistance regions, possesses an increased degree of integration and is of high reliability.

In one aspect, the present invention is characterized by the use of a heat-resistant part comprising a heat-resistant alloy substrate which is coated on its surface with a composite metal oxide of the pervoskite-type structure, viz., $La_{1-x}M^1_xM^2O_3$ wherein $M^1$ is an alkaline earth metal, $M^2$ is Co, Fe, Mn, Ni or Cr and $0 \leq x < 1$.

The film coated on the heat-resistant alloy is an electrically good conductor at high temperatures and is so intimate that it is hardly oxidized or reduced. The thus obtained heat-resistant part is greatly resistant to oxidation and reduction at high temperatures, while retaining a combination of high conductivity with rigidity, processability and the like, and additionally has low contact resistance. The perovkite-type composite oxide expressed by $La_{1-x}M^1_xM^2O_3$ that is a preferable coating film of the present invention is advantageous in that it is stable with respect to an oxidizing/reducing atmosphere at high temperatures, shows an extremely high conductivity of 20 to 100 $S^{-1}cm^{-1}$, and has a coefficient of thermal expansion of $9 \times 10^{-6}/°C$. close to that (13 to $17 \times 10^{-6}/°C$.) of the heat-resistant alloy substrate so that it is unlikely to exfoliate from the substrate due to a difference in the coefficient of thermal expansion. That coating film is suitable for the collectors and interconnectors for the solid electrolyte type of fuel cells in view of the fact that its coefficient of thermal expansion is approximate to that ($\sim 10 \times 10^{-6}$/°C.) of the solid electrolyte.

In the composite metal oxides $La_{1-x}M^1_xM^2O_3$, Co, Fe, Mn, Ni or Cr is used for $M^2$, but particular preference is given to Cr resistant to reduction. The above elements are all fully resistant to oxidation.

Sole use of the composite metal oxide $La_{1-x}M^1_xM^2O_3$ is unsuitable, since it is insulated by an oxide formed on its surface at high temperatures. On the other hand, sole use of the composite oxide $La_{1-x}M^1_xM^2O_3$ is also unpreferred because of difficulty encountered in making it intimate and its fragility and poor processability. In the present invention, therefore, it is proposed to use a heat-resistant alloy as the substrate and coat it with the composite metal oxide $La_{1-x}M^1_xM^2O_3$.

The heat-resistant alloys, although not critical, are preferably based on cobalt, nickel and titanium. More preferably, the heat-resistant alloys should contain smaller amounts of aluminium and silica.

The molar $M^1$/La ratio is preferably in a range of 0 to 0.7, esp., 0.1 to 0.5, since the best conductivity and oxidation resistance are stably achievable in such a range.

The coating film may be formed on the heat-resistant alloy by all the available film-forming techniques inclusive of coating, flame spraying, sputtering, vapor deposition, plasma CVD, MBE, MOCVD, CVD, ion plating and plasma jetting, but particular preference is given to the flame spraying, sputtering and ion plating techniques giving more intimate and more firmly bonded films.

The coating film may be formed directly on the substrate by coating it with the pervoskite-type structure composite oxide composed of $La_{1-x}M^1_xM^2O_3$. Alternatively, the coating film of the pervoskite-type structure composite oxide composed of $La_{1-x}M^1_xM^2O_3$ may be formed on the heat-resisitant alloy substrate containing chromium, cobalt, nickel, iron or manganese by coating its surface with (i) lanthanum and an alkaline earth metal, (ii) lanthanum oxide and an alkaline earth metal, (iii) lanthanum and the oxide of an alkaline earth metal or (iv) lantanum oxide and the oxide of an alkaline earth metal and allowing them to react with the substrate by the following heat treatment. In the heat treatment, the components (i), (ii), (iii) or (iv) are allowed to react with cobalt, nickel, iron or manganese in the alloy in an oxygenous atmosphere at high temperatures to form the composite oxide $La_{1-x}M^1_xM^2O_3$ wherein $M^1$ is an alkaline earth metal, $M^2$ is chromium, cobalt, nickel, iron or manganese, and $0 \leq x < 1$.

It is noted that the conditions for converting the film of the heat-resistant part to the composite oxide $La_{1-x}M^1_xM^2O_3$ depend upon the compositional ratio of La to $M^1$, the composition of the substrate (esp., $M^2$), the thickness of the film, the atmosphere applied and other factors. In general, however, that film is converted to the composite oxide by heat treatment at 1,000° C. for about one hour. Such heat treatment may be carried out exclusively for the conversion of the coating film to the desired composite oxide before the heat-resistant part of the present invention is practically used. Alternatively, it may be carried out by the high-temperature conditions under which the heat-resistant part of the present invention is practically used.

Preferably, the heat-resistant alloy contains 9% by weight or more of chromium, cobalt, nickel, iron or manganese. For instance, an alloy composed of 10.0% by weight of Ni, 20.0% by weight of Cr, 15.0% by weight of W, 1.5% by weight of Fe and the balance being Co, or alloys having such compositions as described later are useful. Preferably, the heat-resistant alloy should not contain Al and 1% by weight of Si.

It is also preferred to heat-treat a coating film having an initial composition of $La_{1-x}M^1_xM^2O_3$ but having high electrical resistance, since the crystal structure is converted to the perovskite-type. Alternatively, such heat treatment may be carried out by using the heat-resistant part at high temperatures.

Preferably, the coating film has a thickness of 0.1 to 10 μm, esp. 0.1 to 1 μm. A film thickness below 0.1 μm has no sufficient effect upon surface protection, whereas a film thickness exceeding 10 μm gives rise to a lowering of the film's conductivity.

While the heat-resistant parts according to the present invention has for the object to provide the collectors and interconnectors for the solid electrolyte type of fuel cells, it is understood that they are useful in all the applications needing electrical conductivity at high temperatures, e.g., in the form of parts for gas turbines, MHD power generation and so on.

Furthermore, the present invention is characterized by the use of a solid electrolyte formed by sintering $Y_2O_3$-containing partially stabilized zirconia to which 5 to 20% of alumina are added. By sintering $Y_2O_3$-containing partially stabilized zirconia to which 5 to 20% of alumina are added, it is possible to obtain a solid electrolyte for fuel cells which maintains its specific resistance during sintering at high temperatures or when it is used as a part of fuel cells at high temperatures for an extended period of time, has high mechanical strength and is stable, and to obtain a fuel cell which has improved characteristics and can stand up to use over an extended period of time.

DESCRIPTION OF THE PREFERRED EMBODIMENTS

The present invention will now be explained with reference to the preferred embodiments illustrated in the accompanying drawings.

Figure 1:
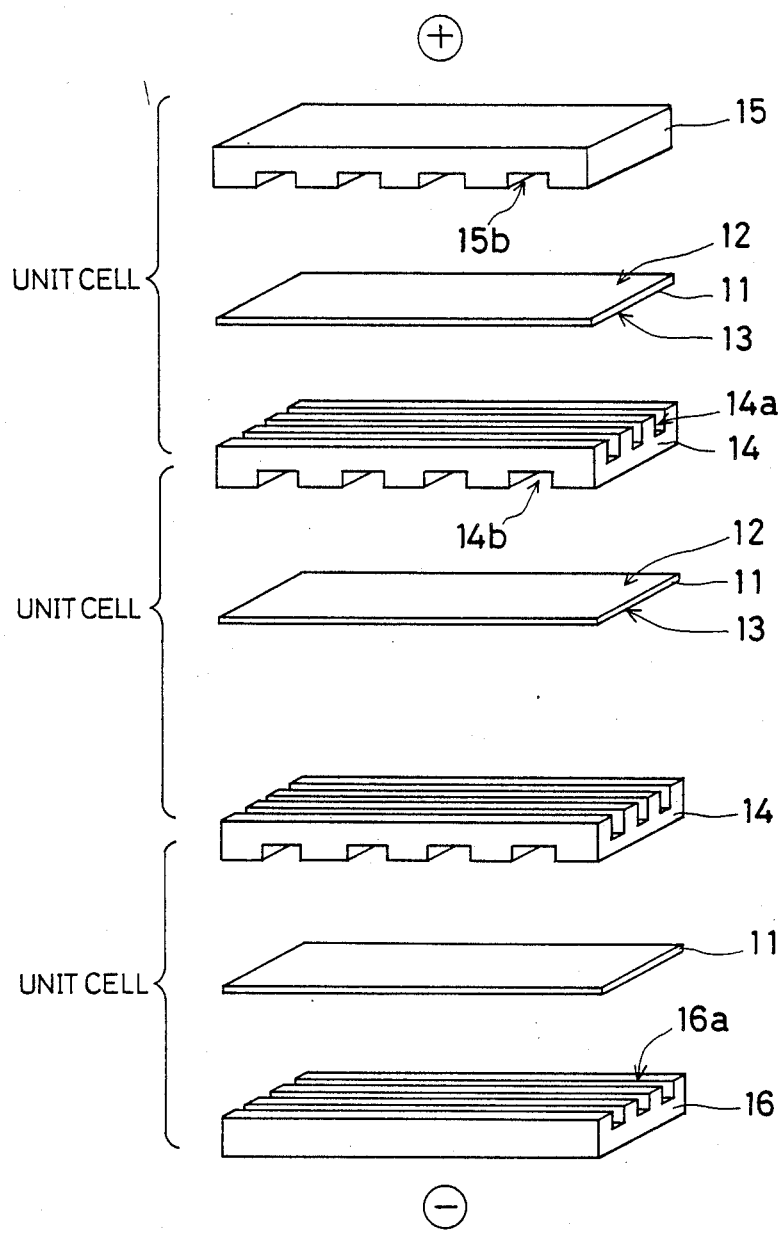
FIG. 1 is an exploded view for schematically illustrating an assembly of unit cells in the solid electrolyte type of fuel cell according to the present invention.

FIG. 1 is an exploded view of an assembly of three cells connected in series. In each of the cells, a solid electrolyte plate 11 in the form of a flat plate is formed on both its sides with a cathode 12 and an anode 13. The solid electrolyte plate 11 comprises a plate-like material formed of a solid electrolyte such as partially stabilized zirconia (zirconia containing 2 to 5 mol % of yttria) and stabilized zirconia, and has a thickness of preferably about 0.05 to 0.3 mm, more preferably 0.08 to 0.25 mm. A thickness less than 0.05 mm offers a strength problem, whereas a thickness exceeding 0.3 mm is unpreferred due to an increase in the length of current paths (some examples of partially stabilized zirconia will later be described). The cathode 12, which defines an oxygen passage, is formed of an electrically conductive material of corrosion resistance to oxygen at high temperatures and is made porous. For example, powders of an electrically conductive composite oxide such as $La_xSr_{1-x}MnO_3$ may be coated on the plate 11 by means of brushing or screen printing. Alternatively, such a porous coating film may be prepared by CVD, plasma CVD, sputtering, flame spraying or other like means. The cathode 12 is made porous sufficiently to transmit a gas therethrough. The anode 13, which defines a hydrogen passage, is formed of an electrically conductive material (e.g., $Ni/ZrO_2$ cermet and so on) of corrosion resistance to hydrogen at high temperatures and is made porous. For instance, powders of a cermet mixture may be coated on the electrolyte plate. The anode 13 is again gas-transmittable. If the cathode and anode can be formed into porous plates, then they may be deposited onto the solid electrolyte for use.

The solid electrolyte plates 11, each having the cathod 12 and the anode 13 formed on both its sides, are integrated together through interconnectors 14, and external terminals 15 and 16 are provided at both ends of the resulting assembly. As seen from FIG. 1, each of the interconnectors 14 makes electrical connections between the electrodes of the adjacent cells, and is provided in both its sides with grooves 14a and 14b which define gas passages on the anodic and cathodic sides of the adjacent cells. The interconnector 14 is formed of an electrically good conductor material of corrosion resistance to the gases used at high temperatures, and may be formed of an electrically conductive heat-resistant part as disclosed in Japanese Patent Application Nos. 62-257274 and 62-258320 as well as an application with a domestic priority based thereof, all filed by the present applicant, (its detailed examples will later be given). Such a heat-resistant part is obtained by forming on the surface of a heat-resistant alloy substrate containing cobalt, chromium, nickel, iron or manganese and a composite oxide expressed by $La_{1-x}M^1_xM^2O_3$ wherein $M^1$ stands for an alkaline earth metal, $M^2$ denotes chromium, nickel, iron, manganese and so on, and $0 \leq x < 1$. Preferably, use may also made of a heat-resistant alloy having on its surface a corrosion-resistant coating film having a high melting point such as, for instance, a coating film of a noble metal such as platinum. With such heat-resistant parts, it is unlikely that the contact resistance between elecrodes may increase with deteriorations of cell characteristics.

Advantageous for the interconnector 14 and solid electrolyte plate 11 is that their differences in gas sealability and the coefficient of thermal expansion in view of dimensions and design are reduced as much as possible. It has now been found that when a zirconia electrolyte is used as the solid electrolyte, metallic chromium is preferably used as an electrically conductive material close thereto in the coefficient of thermal expansion. The coefficient of thermal expansion of the zirconia electrolyte is about $10 \times 10^{-6}/K$, whereas that of the metallic chromium is about $9.4 \times 10^{-6}/K$. In this connection, the coefficients of thermal expansion of chromium oxide and Ni or Co base heat-resistant alloys are $9.6 \times 10^{-6}/K$ and about 13 to $17 \times 10^{-6}/K$, respectively. A coating of $La_{1-x}M_xCrO_3$ wherein M stands for an alkaline earth metal is applied to prevent the corrosion (or oxidation) of the metallic chromium. The coefficient of thermal expansion of this material is approximate to that of the zirconia electrolyte, and is typically as follows.

| Coefficients of thermal expansion of $La_{1-x}M_xCrO_3$ (as measured at temperatures between 25° C. and 1,000° C. | |
|---|---|
| $La_{0.9}Ca_{0.1}CrO_3$ | 9.2 |
| $La_{0.85}Ca_{0.15}CrO_3$ | 9.3 |
| $La_{0.8}Ca_{0.2}CrO_3$ | 9.7 |
| $La_{0.84}Ca_{0.16}CrO_3$ | 9.6 |
| $La_{0.75}Ca_{0.25}CrO_3$ | 10.4 |
| $La_{0.7}Ca_{0.3}CrO_3$ | 10.6 |

In the case of interconnectors for which Ni or Co base alloys are used, it is required to use hot-melt types of adhesives such as glass to absorb a larger difference in the coefficient of thermal expansion between them and the zirconia electrolyte. In contrast, interconnectors based on the metallic chromium are advantageous, because there is no difference between it and zirconia in the coefficient of thermal expansion and because if the adhesives used have a coefficient of thermal expansion equal to its coefficient of thermal expansion, it is then unlikely that they may be exfoliated from such interconnectors. Thus, an interconnector formed of the metallic chromium and having an intimate coating of $La_{1-x}M_xCrO_3$, wherein M stands for an alkaline earth metal, formed thereon by sputtering or other like means is fully compatible with the zirconia solid electrolyte and of high oxidation resistance, sealability and reliability.

Figure 2A:
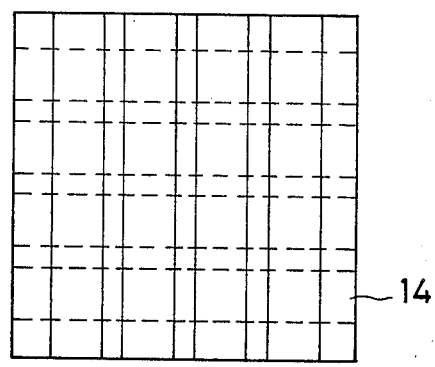
FIG. 2 is a view showing one of the interconnectors.
Figure 2C:
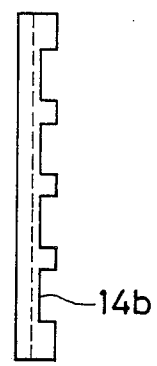
Figure 2B:
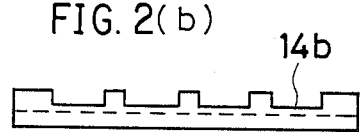
Figure 3:
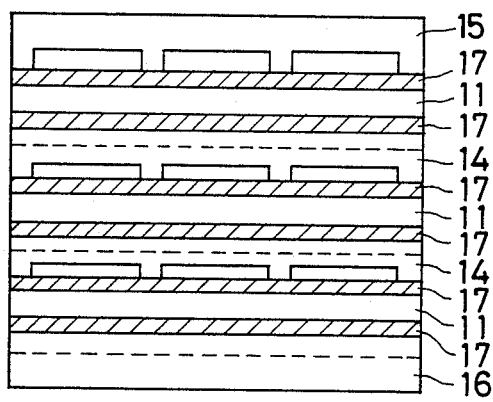
FIG. 3 is a side view showing a modification of the assembly of FIG. 1.

The interconnector 14 is provided in both its sides with the grooves 14a and 14b defining gas passages. The grooves 14a and 14b may be of any configuration and arrangement, provided that fuel and oxidizing gases can be supplied to the associated grooves. In the simplest and most reasonable geometry, however, one group of the grooves 14a disposed in parallel are perpendicular to the other group of the grooves 14b disposed in parallel, as illustrated in FIGS. 1 and 2. With such a geometry, it is possible to locate the inlets and outlets for the fuel gas and the inlets and outlets for the oxidizing agent gas on the same plane after cell integration, thus making it easy to construct the system for feeding and discharging the gases in the cell assembly.

FIG. 2 illustrates one of the interconnectors, wherein (a) is a plan view, (b) a front view, and (c) a lefthand side view. When the solid electrolyte plates, each having the electrodes 12 and 13 formed on both its sides, are integrated together through such interconnectors 14, a current path is formed through the shortest distance defined by external terminal 16→anode 13→solid electrolyte plate 11→cathode 12→interconnector plate 14→anode 13→solid electrolyte plate 11→cathode 12→external terminal 15, viz., in the direction of integration of the cells, so that current components flowing through the cathode 12 and anode 13 of high electrical resistance in their plane directions may be minimized. However, it is unavoidable that the current flows in the plane directions of the cathode 12 and anode 13, since the cathode 12 and anode 13 are in no contact with the interconnectors 14 or the external terminals 15 and 16 in regions of the grooves 14a and 14b in the interconnectors 14 and the grooves 15b and 16a in the external terminals 15 and 16. Consequently, the shortest length of the current path is achieved by proper selection of the configuration and size of the grooves 14a, 14b, 15b and 16a as well as the gaps therebetween, while preventing any pressure losses of the gases. Where the grooves 14a, 14b, 15b and 16a have an increased width, it may be desired to shorten the length of the current path passing through the cathode 12 and anode 13, both being of high resistance, by inserting mesh sheets 17 of highly electrical conductivity between the interconnectors 14 and the cathodes 12 and anodes 13. Such mesh sheets may be formed of platinum, nickel, cobalt and the like, but should most preferably be formed of platinum. The grooves 14a, 14b, 15b and 16a need not be a rectangular in section, and may be of a triangular or other shape in section.

Figure 4A:
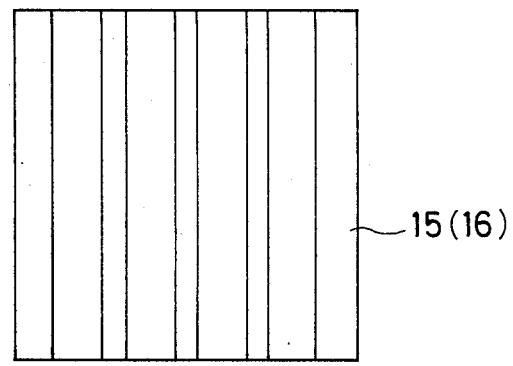
FIG. 4 is a view showing one of the external terminals.
Figure 4B:
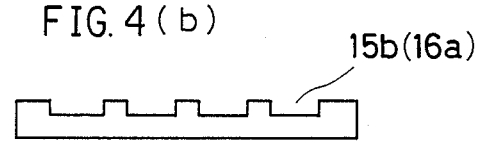

FIG. 4 illustrates the configuration of one of the external terminals, wherein (a) is a plan view and (b) a front view. The illustrated grooves may be of the same configuration as those in one side of the interconnector 14.

When the solid electrolyte plate 11, interconnector 14 and external terminals 15 and 16 are integrated and assembled together, it is required that the solid electrolyte plate 11 (exactly the electrodes 12 and 13) be sealed aginst the interconnector 14 or the external terminals 15 and 16 for the prevention of any gas leakage. This may be achieved with a glass paste having a softening point of about 800° C. by way of example. That glass paste is so fully softened at the operating temperature (900° to 1,000° C.) of a fuel cell that it has a sealing action upon the gases, but allows the electrodes 12 and 13 to be in contact with the interconnector 14 or the external terminals 15 and 16.

Figure 5:
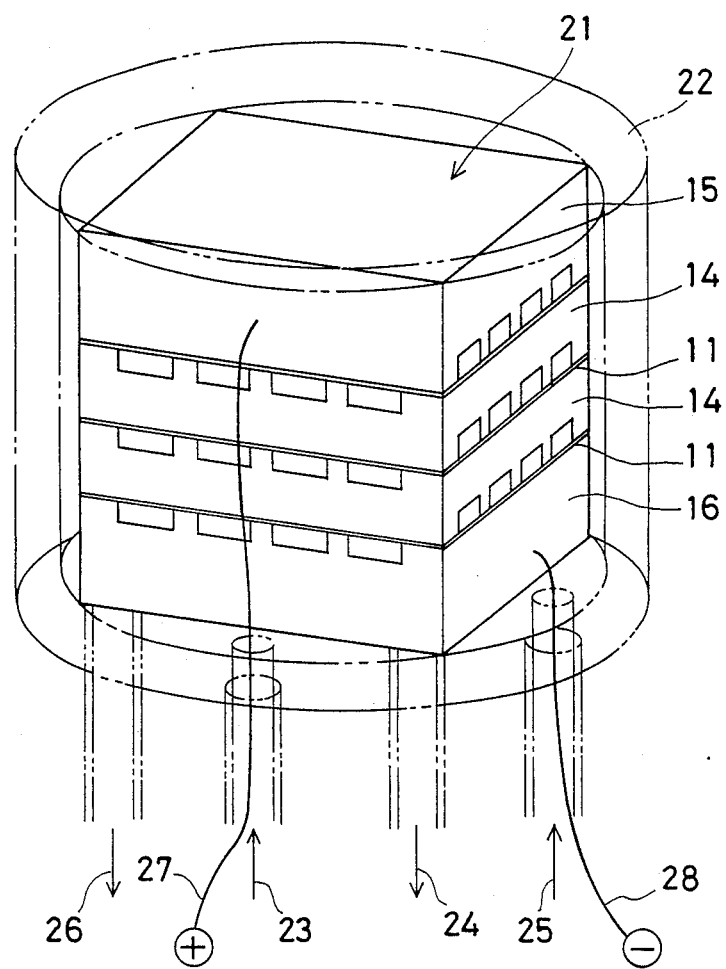
FIG. 5 is a schematical view showing the cell assembly housed in a manifold.

In order to feed the fuel and oxidizing agent gases to the thus assembled fuel cell, a manifold is positioned on the same plane on which both ends of the grooves 14a and 14b are located. FIG. 5 illustrates a manifold positioned in place. An integrated type of fuel cell body 21 assembled as mentioned above is inserted into a cylindrical manifold 22 with the outlets of the grooves 14a and 14b being located in opposition to the wall of the manifold. If (four) regions of contact of the body 21 with the manifold 22 are sealed against gas, then both ends of the grooves 14a and 14b correspond to four gas passages 23 to 26 defined by the cylindrical wall and the manifold 22 and the fuel cell body 21.

EXAMPLE 1

A solid electrolyte type of fuel cell comprising three unit cells connected in series was prepared according to the assembling manner shown in FIG. 1. Heins Alloy No. 25 (an alloy containing 10.0% of Ni, 50.9% of Co, 20.0% of Cr, 15.0% of Wo and the balance being other elements available under the trade name of L-605 from Heins, Co. Ltd.) was used for the interconnectors 14 and the external terminals 15 and 15, and was coated on its surface with an about 6-$\mu$m platinum film by sputtering to suppress its surface corrosion. The interconnector 14 and the external terminals 15 and 16 were shaped as shown in FIGS. 2 and 4. For the interconnector 14, four parallel grooves 14a, each of 7.5 mm in width and 2 mm in depth, were provided at an interval of 3 mm (a pitch of 10.5 mm) in one side of a 50 mm×50 mm×5 mm square plate with similar grooves 14b being provided in the other side. For the external terminal 15 or 16, four parallel grooves 15b or 16a of similar dimensions were provided at the same interval in one side of a similar plate. These dimensions may suitably be determined by mechanical strength, gas-flowing conditions and like factors. For instance, if the same square plate is used, satisfactory results are then obtained at a groove width of 4 to 8 mm, a groove depth of 1 to 3 mm and a groove interval of 0.5 to 5 mm. The grooves 14a and 14b formed in both sides of the interconnector 14 were perpendicular to each other.

Used for the solid electrolyte plate 11 was a 50 mm×50 mm×0.2 mm plate-like material comprising partially stabilized zirconia that was zirconia added with 3 mol % of yttria. Powders of $La_{0.9}Sr_{0.1}MnO_3$ (having a mean particle size of 5 $\mu$m) were coated on the side of the plate 11 defining an oxygen passage side to a thickness of 0.05 mm by brushing to form a cathode 12, and mixed $Ni/ZrO_2$ cermet powders (at a weight ratio of 9:1) were coated on the side of the plate 11 defining a hydrogen passage side to a thickness of 0.01 to 0.05 mm by brushing to form an anode 13.

The solid electrolyte plates 11, interconnectors 14 and external terminals 15 and 16 were integrated together as illustrated in FIG. 1, and a glass paste having a softening point of about 800° C. was applied around the sides of the solid electrolyte plates 11 and interconnectors 14 for gas sealing purposes. As already mentioned, this glass plate is softened at the operating temperature of the fuel cell for gas sealing.

As illustrated in FIG. 5, the thus integrated fuel cell is housed in a cylindrical manifold 22 made of alumina. The regions of contact of the manifold 22 with a cell body 21 were joined together by coating and drying of a ceramic paste, followed by coating of a glass paste for gas sealing.

Platinum lead terminals 27 and 28 were inserted through bores formed in the external terminals 15 and 16 for electrical connection.

The thus prepared fuel cell was heated. Heating was carried out at a rate of 1° C./min from room temperature to 150° C. to evaporate off the solvent of the glass paste. From 150° C. to 300° C., a heating rate of 5° C./min was applied. At higher than 300° C., a nitrogen gas was passed 5° C. /min was applied. At higher than 300° C., nitrogen gas was passed through the hydrogen passages to prevent the oxidation of the anode, and from that temperature to 1,000° C. a heating rate of 10° C./min was applied. Afterwards, while the fuel cell was held at 1,000° C., hydrogen and oxygen were fed to the anodic and cathodic sides, respectively, thereby initiating power generation. The open voltage was 3.0V. The discharging characteristics were set out in a table as given just below. The gas cross leak was about 10% of hydrogen.

| Voltage (V) | Current (A) |
| --- | --- |
| 2.5 | 0.11 |
| 2.0 | 0.24 |
| 1.5 | 0.36 |
| 1.0 | 0.48 |

For the purpose of comparison, a solid electrolyte type of fuel cell was prepared in the same manner as mentioned just above, provided however that an uncoated Heins alloy was for the interconnectors. In this case, the discharging characteristics were 0.21A at 1.5V.

EXAMPLE 2

A fuel cell was made in the same manner as described just above, provided however that metallic chromium coated on its surface with an about 5-$\mu$m thick of $La_{0.9}Ca_{0.1}CrO_3$ by sputtering was used for the interconnectors.

When power generation was initiated under the same conditions as in Example 1, the open voltage was 3.2V. The discharging characteristics were set out in a table given just below, and the gas cross leak was about 1% of hydrogen.

| Voltage (V) | Current (A) |
| --- | --- |
| 2.5 | 0.11 |
| 2.0 | 0.25 |
| 1.5 | 0.39 |
| 1.0 | 0.50 |

EXAMPLE 3

Figure 6:
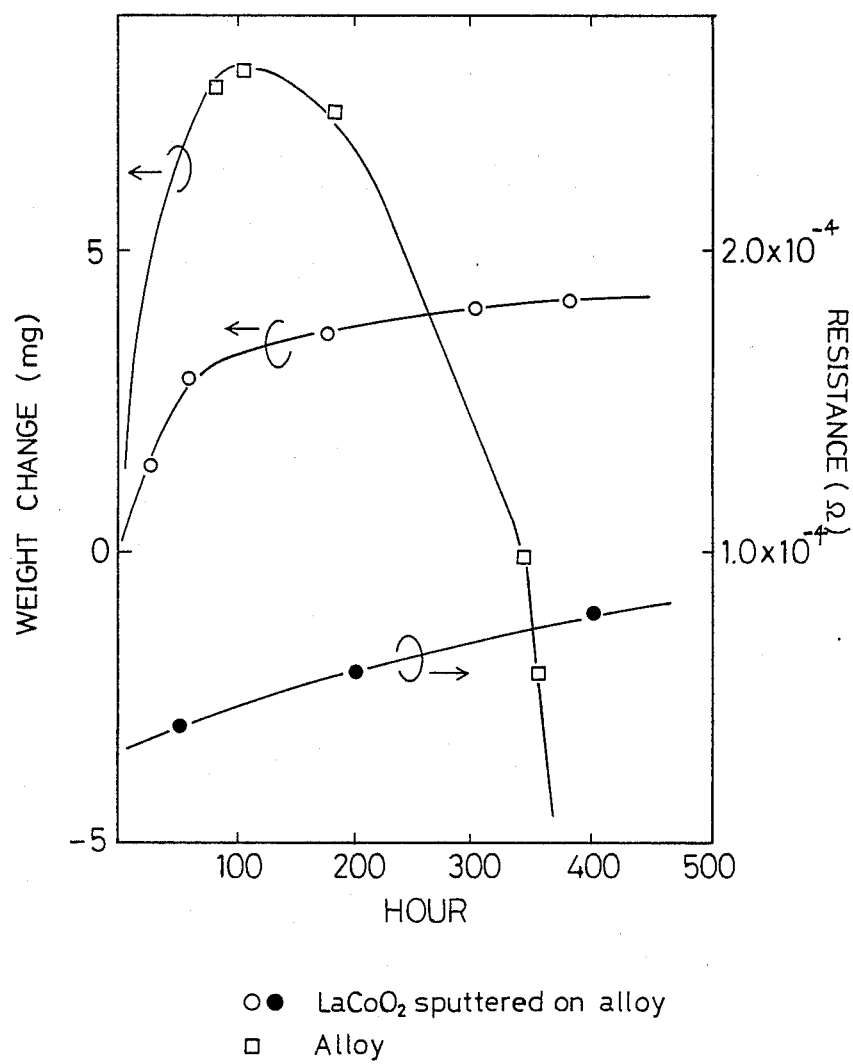
FIG. 6 is a graphical view showing the weight and resistance changes of the coating film at 1,000° C. in air.

An about 1.5-$\mu$m thick film of $LaCoO_3$ was formed on a cobalt base alloy plate (W: 14.57%, Co: 52.51%, Cr: 19.69%, Ni: 9.39%, C: 0.10%, Si: 0.48% and Mn: 1.51%) by Rf sputtering in conventional manners. Rf sputtering was carried out at an argon gas pressure of 2 to 5 millitorr and a power of 100 to 200W for one hour. As a result of 24-hour heat treatment at 1,000° C. in air, it was found that a layer of $LaCoO_3$ was formed on the surface of the alloy. The purpose of this heat treatment was to covert to $LaCoO_3$ $LaCoO_{3-y}$ which was possibly formed by the escape of a part of oxygen in the sputtering process. Consequently, if the film of $LaCoO_3$ is formed depending upon the conditions for the sputtering process, any heat treatment can then be dispensed with. The changes in the weight and surface resistance of this sample at 1,000° C. are shown in FIG. 6, from which it is found that there are slight increases in the weight and surface resistance with time. The stability of the sample at 1,000° C. in air is much superior to that of the alloy having no $LaCoO_3$ coating formed on its surface.

EXAMPLE 4

A mixture of $La_2O_3/SrCO_3$ (at a molar ratio of 3/1) was coated on both sides of each of the alloy plates having their compositions specified in Table 1 to a thickness of about 1 $\mu$m by means of Rf sputtering in a similar manner as mentioned in Example 1, and the thus treated alloy plates were heated at 1,000° C. for 24 hours in air.

As a consequence of X-ray diffractometry of the reaction products on the surfaces of the alloys, it was ascertained that the products tabulated in Table 2 were formed.

Figure 7:
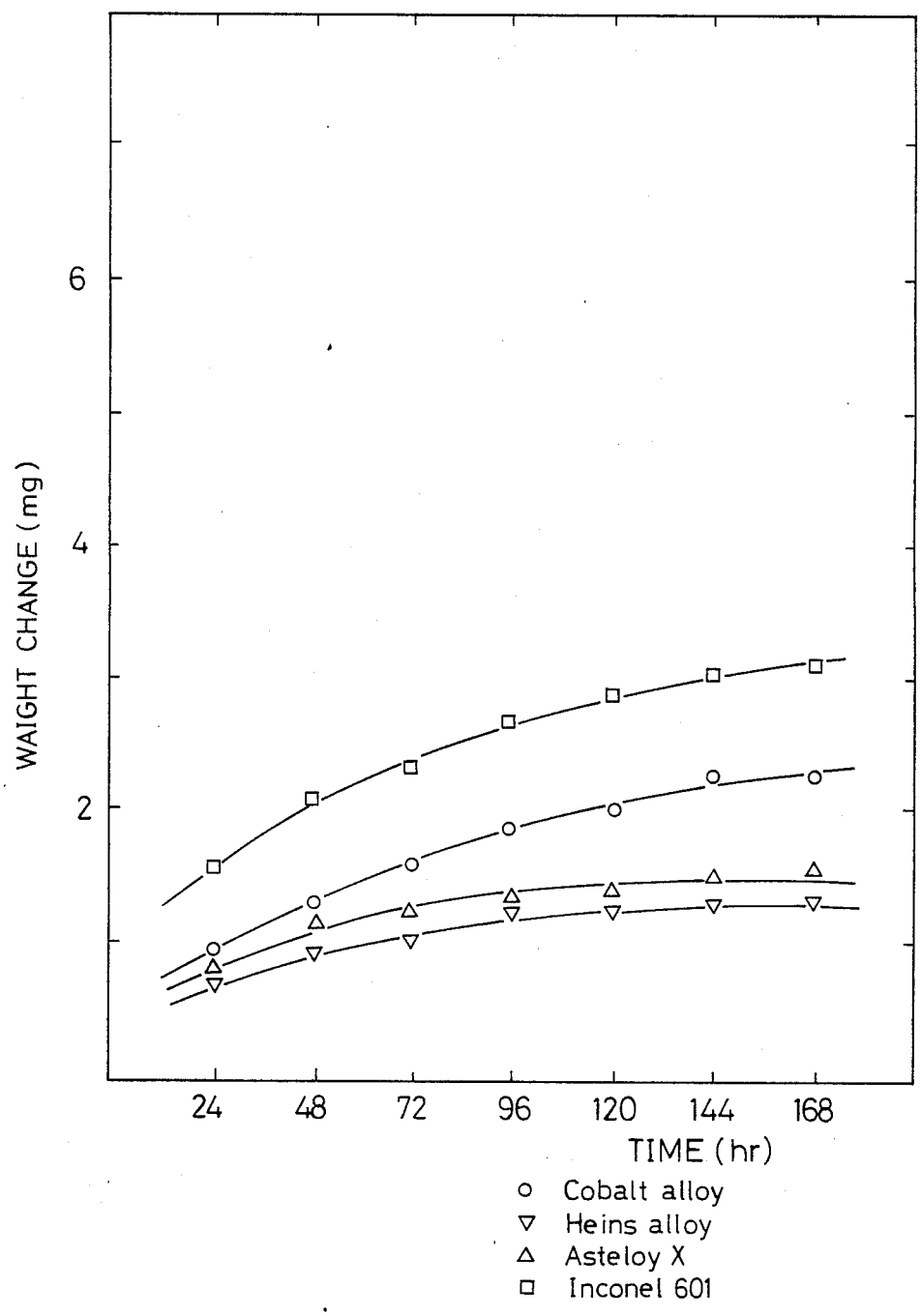
FIGS. 7 and 8 are graphical views showing the weight changes of the coated and uncoated alloys at 1,000° C. in air.
Figure 8:
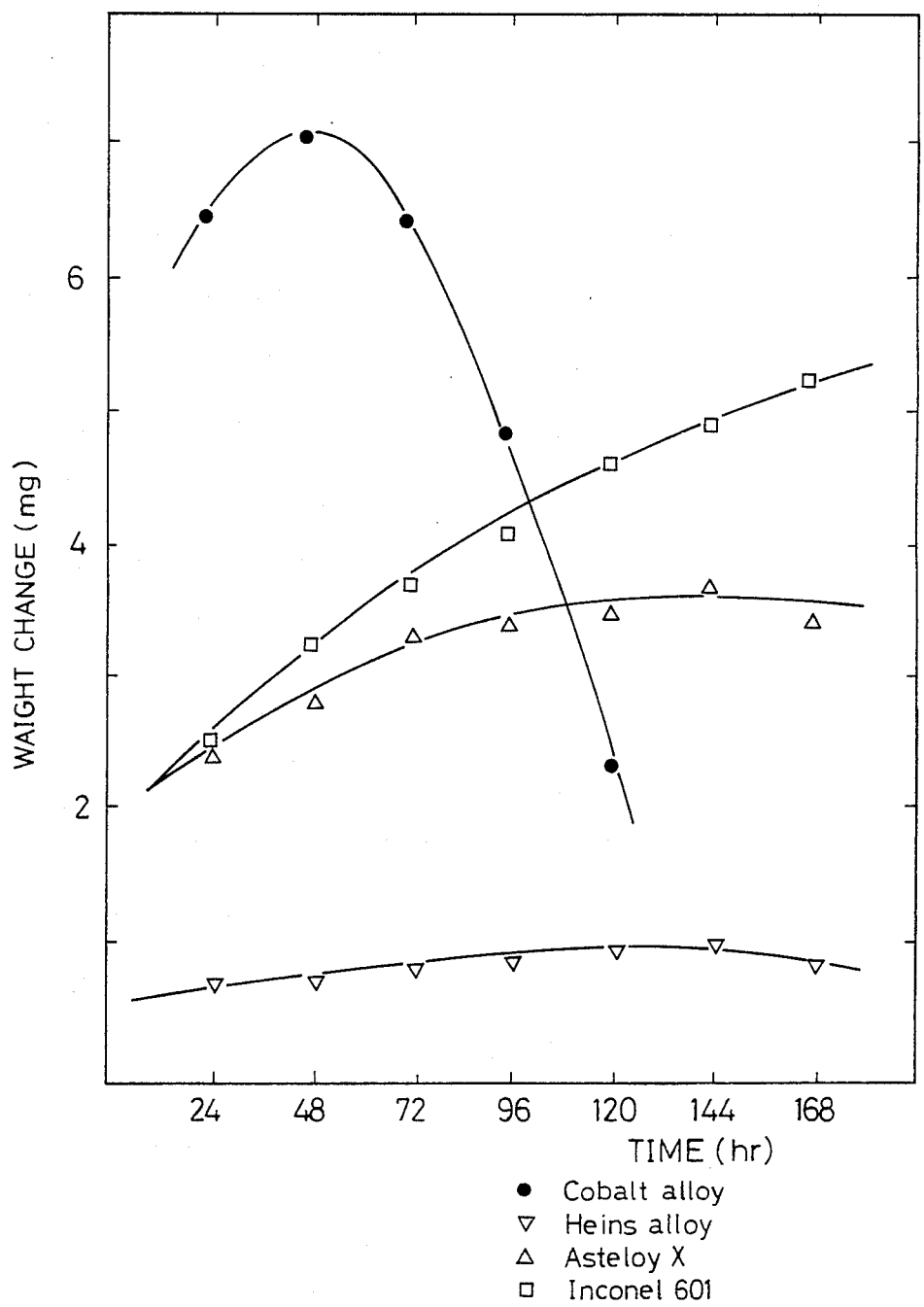

After the deposition of $La_2O_3/SrCO_3$, the samples were heated at 1,000° C. in air to measure the weight changes, which are shown in FIG. 7. For the purpose of comparison, FIG. 8 shows changes in the weight of the alloy having no $La_2O_3/SrCO_3$ deposited on its surface.

Table 2 shows the surface electrical resistance of the coated and uncoated alloys after the above heat treatment.

TABLE 1

| Alloys | Ni | Co | Cr | Mo | W | Fe | C | Mn | Si | Al |
| --- | --- | --- | --- | --- | --- | --- | --- | --- | --- | --- |
| Cobalt alloy | 9.4 | 54.2 | 19.7 | — | 14.6 | — | 0.1 | 1.5 | 0.5 | — |
| Heins alloy* | 10.0 | 50.9 | 20.0 | — | 15.0 | 1.5 | 0.1 | 1.5 | 1.0 | — |
| Inconel 601** | 60.1 | — | 23.0 | — | — | 14.0 | 0.1 | 1.0 | 0.5 | 1.3 |
| Hastelloy*** | 46.8 | 1.5 | 22.0 | 9.0 | 0.6 | 18.0 | 0.1 | 1.0 | 1.0 | — |

*Commercial Product of Heins Co., Ltd.
**Commercial Product of Inco Co., Ltd.
***Commercial Product of Mitsubishi Metal Corporation

TABLE 2

| Alloys | Heat Treatment at 1,000° C. in air | | |
| --- | --- | --- | --- |
| | Sputtered Film | Reaction Products | Electrical Resistance ($\Omega$) |
| Cobalt Alloy | Undeposited | $Cr_2O_3$ | 4.8 |
| | Deposited | $La_{0.95}Sr_{0.05}CrO_3$ | 4.9 |
| Heins Alloy | Undeposited | $Cr_2O_3$ | 16.7 |
| | Deposited | $La_{0.95}Sr_{0.05}CrO_3$ | 19.3 |
| Inconel 601 | Undeposited | $Cr_2O_3$, $Al_2O_3$ | 10.1 |
| | Deposited | $Al_2O_3$, $La_{0.95}Sr_{0.05}CrO_3$ | 18.1 |
| Hasterlloy X | Undeposited | $Cr_2O_3$ | 230.0 |
| | Deposited | $La_{0.9}Sr_{0.1}CrO_3$ | 7.9 |

EXAMPLE 5

An about 1-$\mu$m thick target of $La_{0.9}Sr_{0.1}CrO_3$ was deposited on a cobalt base alloy (similar to that used in Ex. 3) by Rf sputtering under the same conditions as applied in Ex. 1. The thus prepared $La_{0.9}Sr_{0.1}CrO_3$-coated alloy showed a weight change of 1% or lower at 1,000° C. for 200 hours in air and a surface resistance value change within 100%. Neither weight change nor surface resistance change was found at 1,000° C. for 200 hours in a hydrogen atmosphere.

Electrical power can stably be generated over an extended period of time with the laminated structure of the solid electrolyte type of fuel cell shown in FIG. 1 wherein, for instance, $NiO/ZrO_2$ is used for the anodes 12, $La_{0.9}Sr_{0.1}MnO_3$ for the cathodes 13, the $La_{0.9}Sr_{0.1}CrO$-coated cobalt base alloy for the interconnectors 14 and the heat-resistant part of the present invention for the electrode terminals 15 and 16.

EXAMPLE 6

A mixture of $La_2O_3/SrO$ (at a molar ratio of 2:1) was deposited on both sides of a cobalt base alloy plate (of 10 mm×10 mm×1 mm and composed of 14.57% of W, 52.51% of Co, 19.69% of Cr, 9.39% of Ni, 0.10% of C, 0.48% of Si and 1.51% of Mn) to a thickness of about 1 $\mu$m by Rf sputtering in conventional manners. Rf sputtering was carried out at an argon gas pressure of 2 to 5 millitorr and a power of 100 to 200W for one hour. The sample was heated at 1,000° C. for 24 hours in air.

Figures 9, 10:
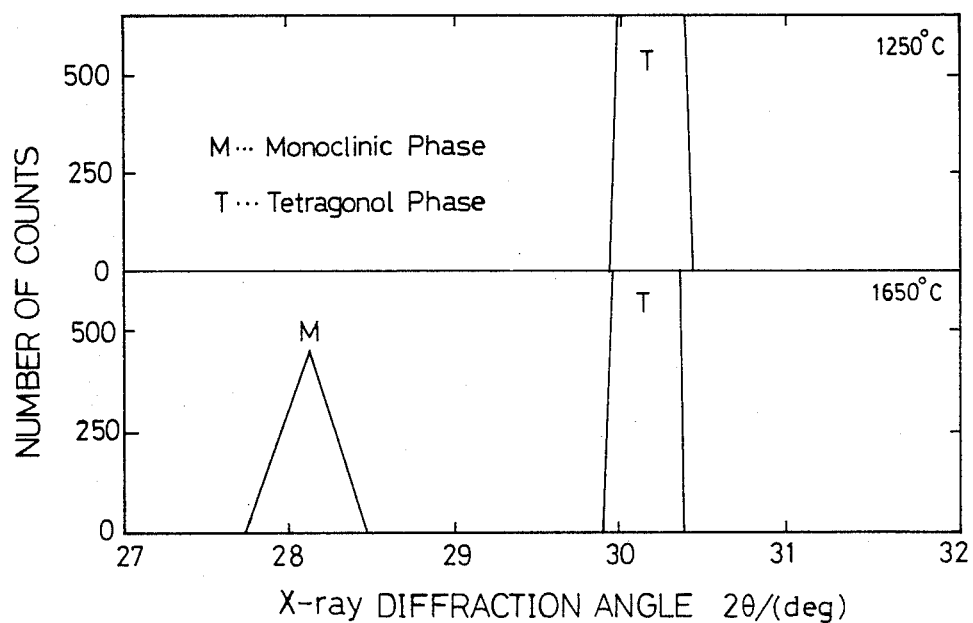
FIG. 9 is a table showing the proportion of the T-phase at varied sintering temperatures.
FIG. 10 is a graphical view showing the proportions of the T and M-phases in the sample 3Y at 1250° C. and 1650° C.

After gradual cooling of the sample to room temperature, the reaction products formed on its surface were identified as $La_{1-x}Sr_xCrO_3$ wherein x=0.1 to 0.5 by an X-ray diffractometry unit. (The fact that $M^2$ was Cr with no Co found was presumably due to the reactivity of Cr being higher than that of Co). FIG. 9 shows the weight and surface resistance changes versus time of the sample, when heated at 1,000° C. in air.

The surface resistance was measured by the four-probe method in conventional manners. For the purpose of comparison, the weight change of an alloy having no thin film of $La_2O_3/SrO$ formed on its surface is also shown.

The alloy having no thin film showed a maximum weight increase at the time when it was heated for about 100 hours but, after that, the weight decreased. Such a weight reduction was attributed to an exfoliation of the oxides formed on the surface of the alloy, primarily chromium oxide and cobalt oxide. It is noted that the sample consisting of the alloy alone showed a surface resistance value approximate to that of an insulator by 24-hour heating at 1,000° C. due to chromium oxide and cobalt oxide formed on its surface. It is also noted that this cobalt base alloy showed nor surface change or weight increase at 1,000° C. in a reducing atmosphere (consisting of 10% of hydrogen and 90% of argon).

EXAMPLE 7

FIG. 9 shows the proportion of the T-phase in the samples obtained by mixing TZ-3Y (3 mol % - $Y_2O_3/ZrO_2$) manufactured by Toso Industries, Inc. with AKP-20 (high-purity $Al_2O_3$) manufactured by Sumitomo Chemical Co., Ltd. in the proportions specified below with the use of a planetary mill, etc. to obtain alumina/zirconia powders, compacting the powders and sintering the obtained compacts at temperatures of 1,250° C., 1,350° C., 1,450° C., 1,550° C. and 1,650° C. for 10 hours.

3Y: TZ-3Y alone
3Y5A: TZ-3Y:AKP-20=95:5 (% by weight)
3Y20A: TZ-3Y:AKP-20=80:20 (% by weight)
3Y40A: TZ-3Y:AKP-20=60:40 (% by weight).

As can be seen from FIG. 9, the occurrence of the M-phase is not found in all the samples 3Y, 3Y5A, 3Y20 A and 3Y40A at relatively low temperatures of 1,250° C. and 1,350° C. However, a sufficient sintering is achieved in such a temperature region. At 1,450° C. or higher temperature, the proportion of the T-phase dreceases with an increase in the proportion of the M-phase in the sample 3Y containing no alumina. On the other hand, it is found that no T to M-phase transformation takes place in the samples 3Y5A, 3Y20A and 3Y40A having the respective alumina contents of 5%, 20% and 40%.

The results of FIG. 9 are obtained with the samples sintered at high temperatures (of 1,250° C. or more). As regards the sample 3Y, its porportion of the T to M-phase transformation increases. Fuel cells are not used at such higher temperatures (1,250° C. or more) as applied for sintering, but are designed to operate at high temperatures of 1,000° C. Consequently, the T to M-phase transformation which has occured at 1,300° C. or higher is likely to take place under operation conditions over an extended period of time. The presence of the M-phase of high resistivity leads to an increase in the resistance value of the overall fuel assembly and a decrease in the strength thereof.

However, the partially stabilized zirconia to which alumina is added is expected to maintain low resistance, even when it is used as a part of fuel cells at high temperatures over an extended period of time, since no T to M-phase transformation takes place even at high temperatures.

Thus, the solid electrolyte of the present invention can be made intimate and formed into a thin plate since no T to M-phase transformation occurs at high temperatures.

FIG. 10 shows the results of the proportion of the M and T-phases in the sample 3Y quantitatively determined at 1,250° C. and 1,650° C. by X-ray diffractometry, and indicates that the M-phase is developed at a higher temperature. In FIG. 10, it is noted that the results are plotted with the angle of X-ray diffraction as abscissa and the number of counts per X-rays a minute as ordinate.

It is noted in this connection that although the partially stabilized zirconia per se is a good ion conductor, its resistance value increases with an increase in the amount of alumina added, since alumina is originally an insulator.

Figure 11:
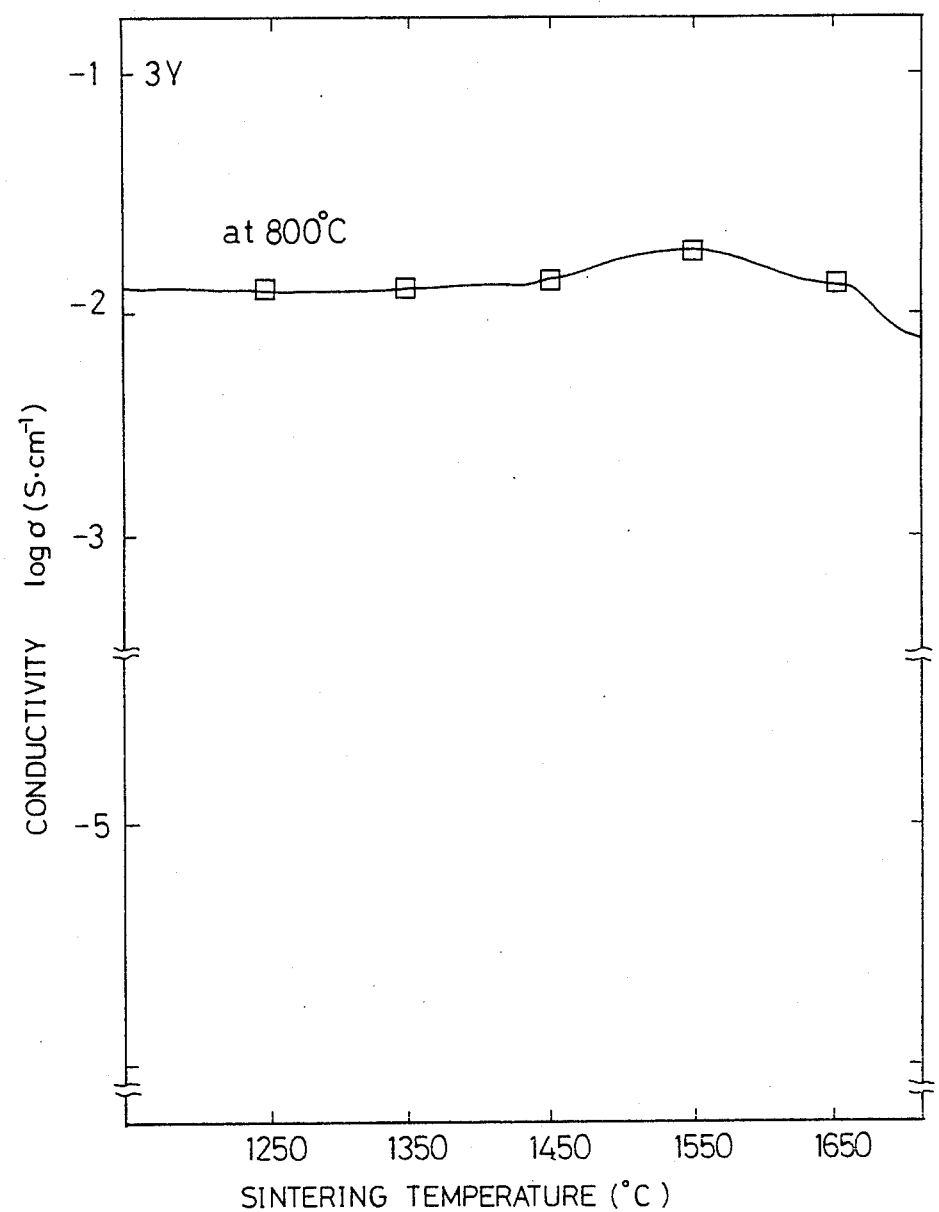
FIG. 11 is a graphical view showing the conductivity at 800° C. in the absence of alumina.
Figure 12:
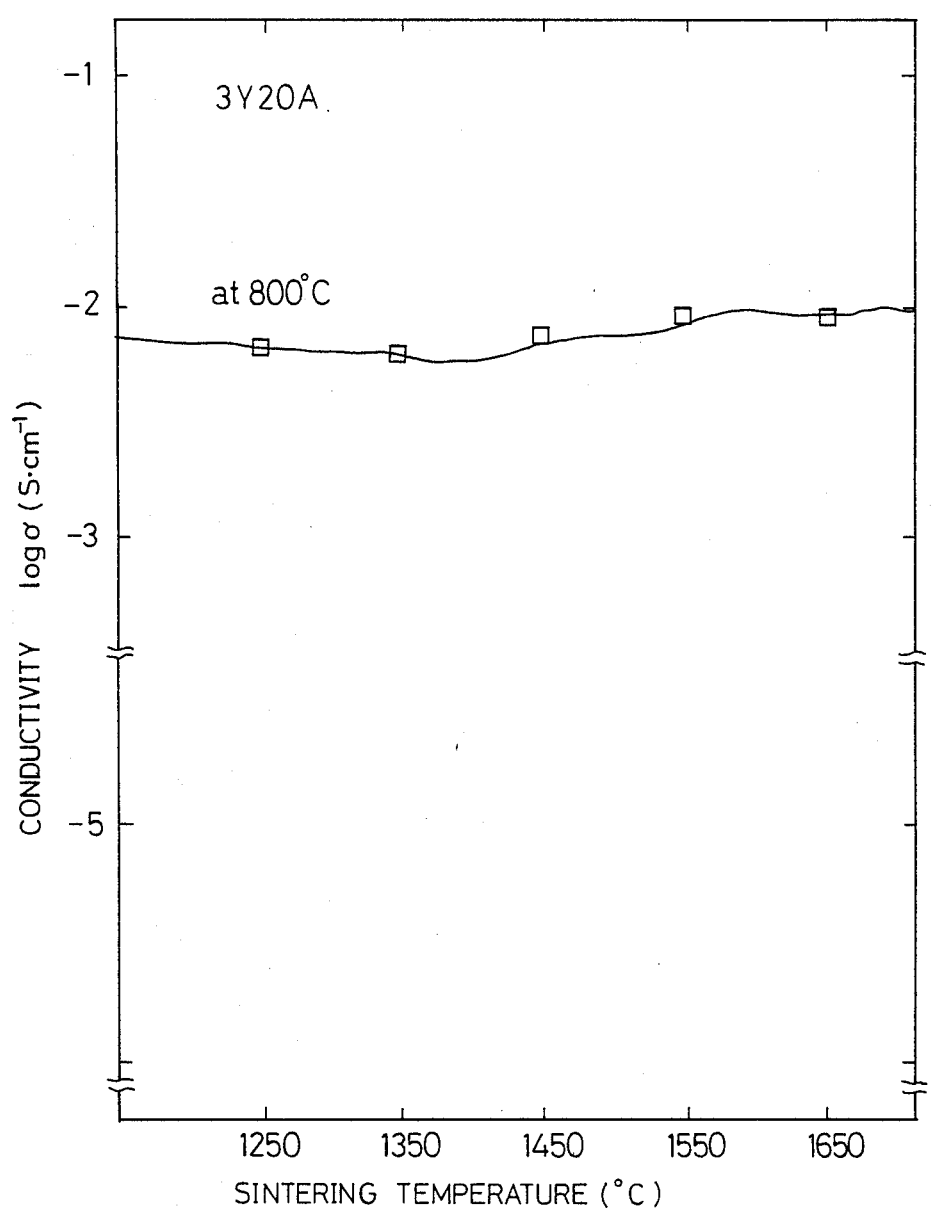
FIG. 12 is a graphical view the conductivity at 800° C. in the presence of 20% by weight of alumina.
Figure 13:
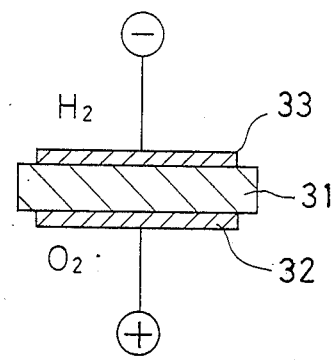
FIG. 13 is a schematical view illustrating the basic structure of a solid electrolyte type of fuel cell.
Figure 14:
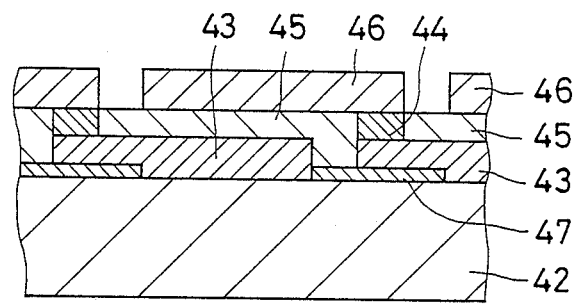
FIGS. 14 and 15 are views illustrating the structures of conventional solid electrolyte type of fuel cells.
Figure 14A:
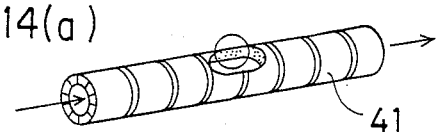
Figure 15:
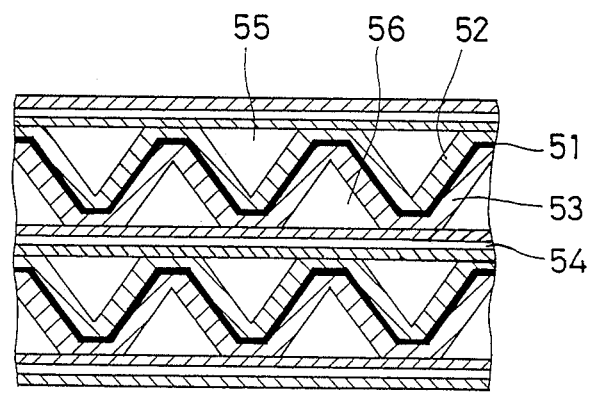
Figure 16:
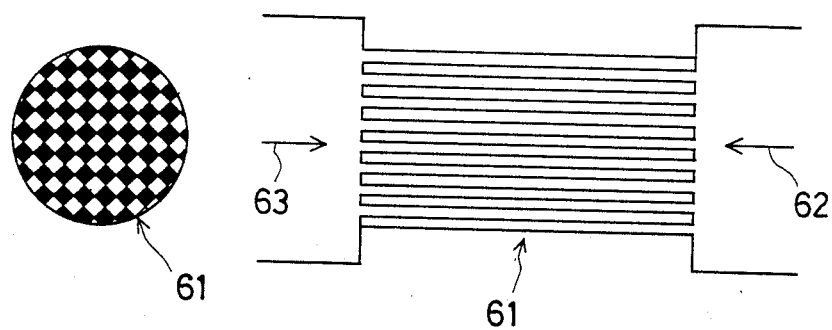
FIGS. 16 and 17 are schematical views of conventional high-temperature solid electrolyte type of fuel cells.
Figure 17:
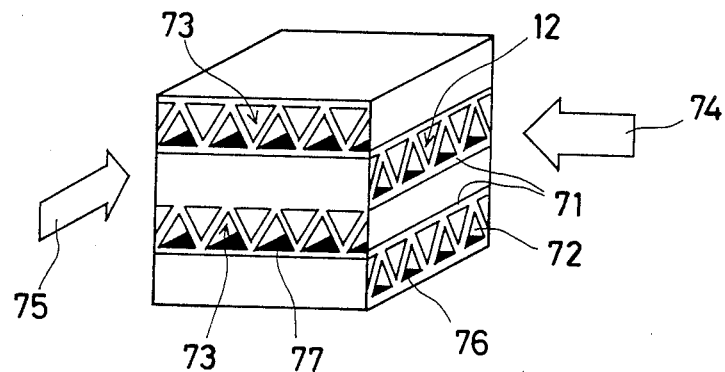

FIG. 11 shows the conductivity at 800° C. of the sample 3Y to which no alumina is added, and FIG. 12 the conductivity at 800° C. of the sample 3Y-20A. It is appreciated that at 800° C., the samples consist purely of the T-phase alone with no M-phase being developed.

From a comparison of FIG. 11 with FIG. 12, it is found that there is little or no difference in the resistance value between the samples with and without 20% of alumina. However, a further increase in the amount of alumina added results in increased resistance value under the influence of the insulation properties of alumina, and is thus not preferred in view of the solid electrolytes for fuel cells. When the amount of alumina added is too small, the M-phase was found to be developed at high temperature. As a consequence of various experiments, it has been found that it is preferred to add 5 to 20%, esp., 5 to 10% of alumina to the solid electrolytes for fuel cells, since the resistance can be kept low due to no occurrence of the T to M-phase transformation.

According to the present invention as detailed above, there is provided a solid electrolyte type fuel cell of the planar type integrated structure. It is thus possible to obtain a solid electrolyte type of fuel cell in which the current path running through the cathodes and anodes of high electrical resistance is minimized to considerably reduce ohmic losses, and which is a high degree of integration, is of a simplified structure and is easy to produce.

By using the heat-resistant part comprising a heat-resistant alloy of electrically good conductivity having thereon a protective film resistant to an oxidizing/reducing atmosphere at elevated temperatures of 1,000° C. or higher and showing an electrical conductivity of 20 to 100 S cm$^{-1}$, it is possible to make a high-temperature solid electrolyte type of fuel cell of the integrated structure which is much superior to conventional high-temperature solid electrolyte type of fuel cells.

By adding 5 to 20% of alumina to $Y_2O_3$-containing partially stabilized zirconia, it is further possible to prevent the tetragonal to monoclinic phase transformation from occurring even at high temperatures, avoid intergranular fracture due to a lowering of electrical conductivity and a change in the volume of grains, maintain low resistance and increase power density. In addition, it is possible to obtain a solid electrolyte type of fuel cell which is of stability improved by increased mechanical strength and in which the electrolyte is made intimate and hence formed into a thin plate.

What is claimed is:

1. A solid electrolyte fuel cell comprising a plurality of solid electrolyte plates, each being in the form of a flat plate and having a porous cathodic layer on one side and a porous anodic layer on the other side; the solid electrolyte plates are laminated together through at least one interconnector plate defined by a heat-resistant part composed of a metal complex oxide film formed on an electrically conductive heat-resistant alloy, the at least one interconnector plate having in both its sides grooves defining passages wherein an oxidizing agent and fuel gases are fed to the cathodic and anodic sides through said passages, and a current is obtained from anodic and cathodic electrodes located at upper and lower ends of an assembly of the connected electrolyte plates.

2. A solid electrolyte fuel cell as claimed in claim 1, wherein each of said solid electrolyte plates is formed by sintering $Y_2O_3$-containing partially stabilized zirconia to which 5 to 20% of alumina is added.

3. A solid electrolyte fuel cell as claimed in claim 1, wherein said heat-resistant part is formed by coating on the surface of the heat-resistant alloy containing chromium, cobalt, nickel, iron or manganese a compound selected from the group consisting of (i) lanthanum and an alkaline earth metal, (ii) lanthanum oxide and an alkaline earth metal, (iii) lanthanum and an oxide of an alkaline earth metal and (iv) lanthanum oxide and an oxide of an alkaline earth metal.

4. A solid electrolyte fuel cell as claimed in claim 1, wherein said heat-resistant part is formed by coating on the surface of a heat-resistant alloy substrate a composite metal oxide expressed by:

$$La_{1-x}M^1{}_xM^2O_3$$

wherein
M$^1$ is an alkaline earth metal,
M$^2$ is Co, Fe, Mn, Ni or Cr, and
$0 \leq x < 1$.

5. A solid electrolyte fuel cell as claimed in claim 1, wherein said heat-resistant part is formed of $La_{1-x}M^1{}_xM^2O_3$ of a perovskite crystal structure.

6. A solid electrolyte fuel cell as claimed in claim 1, wherein said heat-resistant alloy is comprised of at least one element selected from the group consisting of, cobalt, nickel, titanium and metallic chromium.

7. A solid electrolyte fuel cell as claimed in claim 1, wherein said heat-resistant part has a molar ratio of lanthanum and an alkaline earth metal ranging from 0.05 to 0.7.

8. A solid electrolyte fuel cell as claimed in claim 1, wherein said heat-resistant part has a surface film of 0.1 μm to 10 μm in thickness.

9. A solid electrolyte fuel cell as claimed in claim 1, wherein said heat-resistant part is an interconnector for connecting the cathode of one unit cell of a high-temperature fuel cell to the anode of the other unit cell.

10. A solid electrolyte fuel cell as claimed in claim 1, wherein said heat-resistant part is a cathodic collector of a high-temperature fuel cell.

* * * * *